Oct. 6, 1970   J. K. TRUITT   3,532,550
FUEL CELL WITH ALTERNATELY FOLDED SHEET ELECTRODE
Filed April 25, 1968   3 Sheets-Sheet 1
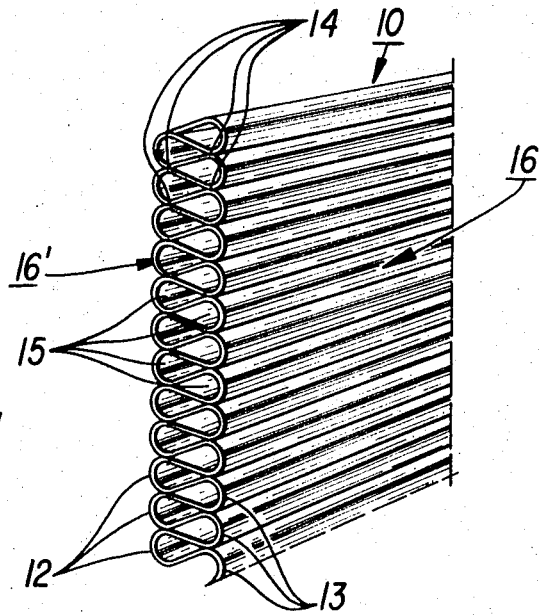
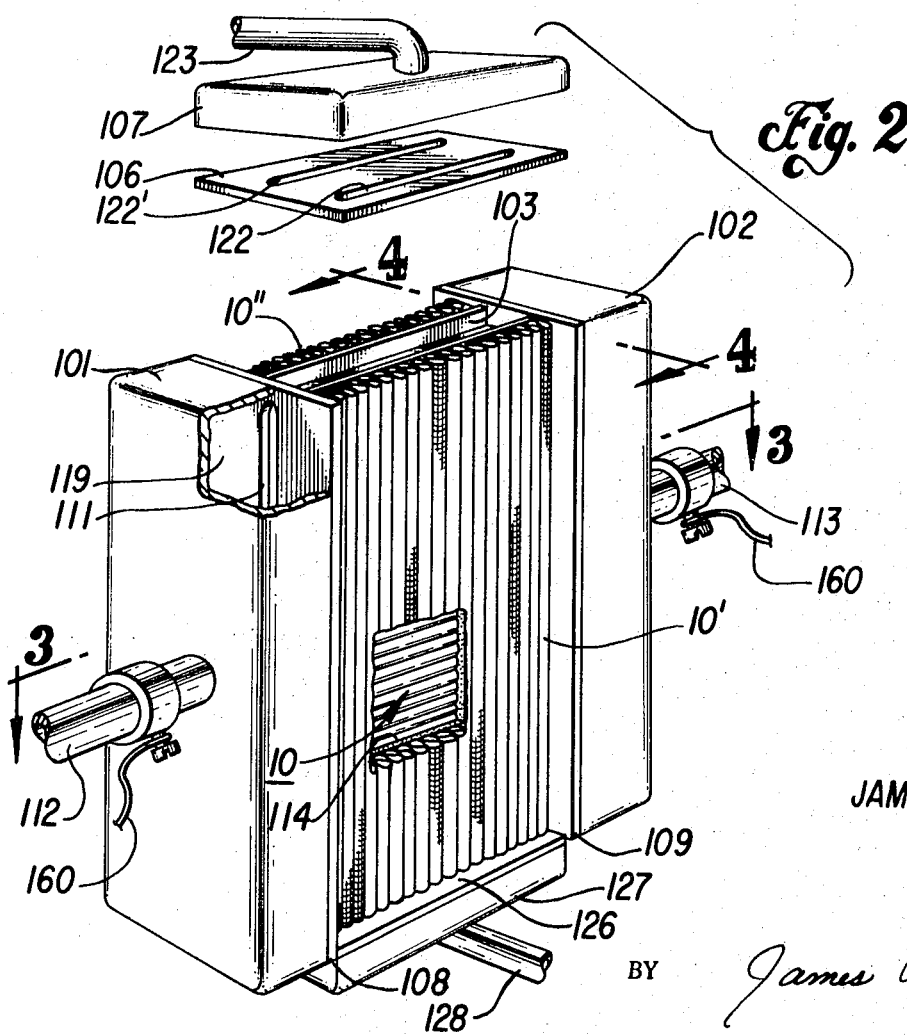
JAMES K. TRUITT
INVENTOR
BY James C. Fails
ATTORNEY

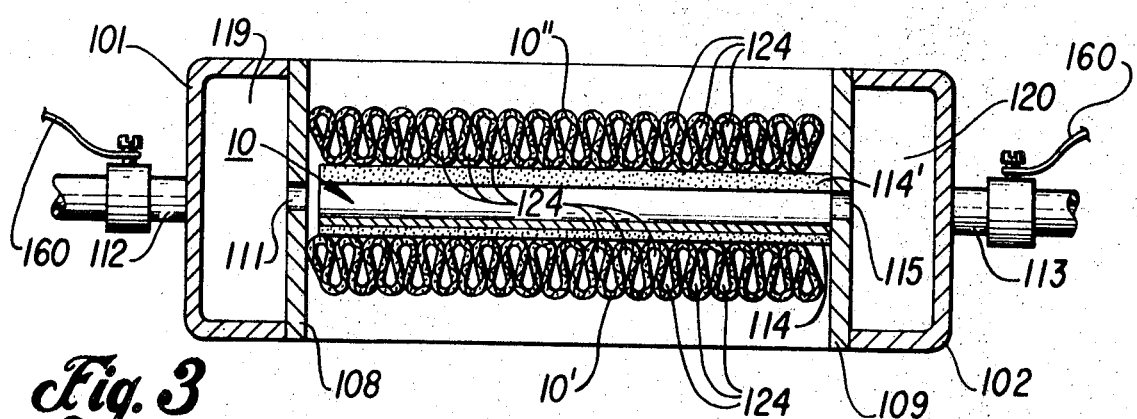
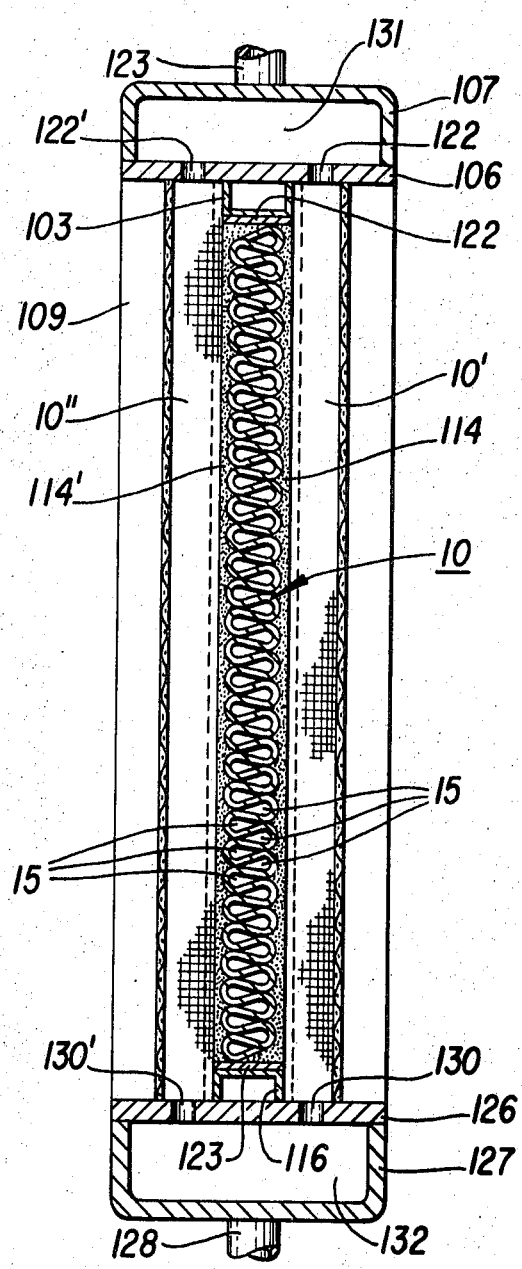

Oct. 6, 1970  J. K. TRUITT  3,532,550
FUEL CELL WITH ALTERNATELY FOLDED SHEET ELECTRODE
Filed April 25, 1968  3 Sheets-Sheet 3

United States Patent Office 3,532,550
Patented Oct. 6, 1970

3,532,550
FUEL CELL WITH ALTERNATELY FOLDED SHEET ELECTRODE
James K. Truitt, Dallas, Tex., assignor to Texas Instruments Incorporated, Dallas, Tex., a corporation of Delaware
Filed Apr. 25, 1968, Ser. No. 724,097
Int. Cl. H01m 27/00
U.S. Cl. 136—86
9 Claims

ABSTRACT OF THE DISCLOSURE

A fuel cell is disclosed having electrodes each of a single metal sheet or of a single metal screen formed into a series of tear-drop shaped folds which for any given cell space increase the reaction area of reactant and electrolyte upon the surface of the electrode.

---

This invention relates to improvements in electrodes for use in fuel cells and the like.

The development of fuel cells for powering automobiles, trucks, satellites, or space stations, for example, is becoming of increasing importance. To fill the vigorous demands of such possible uses, highly efficient multicell power packages of compact size and high power densities will be required.

Presently used fuel cells generally comprise two electrodes (a cathode and an anode) separated by an electrolyte. At each electrode, a partial chemical reaction occurs: between reductant and electrolyte on one electrode and between oxidizer and electrolyte on the other, creating an electric potential difference between the electrodes, and, of course, furnishing electrical power.

The power density, the power output per unit of cell volume, is determined, in part, by the extent of the contact between the reactant, air (oxidizer) or fuel (reductant), and the electrolyte. This contact is obviously increased as the reaction area of the electrodes in the reactant streams in increased. One requirement of an ideal electrode, therefore, is that its reaction area be made as large as possible. In the prior art, one attempt to satisfy this requirement has been to use a plurality of interconnected electrode elements; this attempt, however, was not wholly successful because the size of the cell became unduly large in relation to its power density.

In addition to power density, the overall efficiency of the cell must be considered in fuel cell design. Efficiency is affected, in part, by such factors as the internal resistance of the cell, the amount of contamination of the fuel, the availability of reactants at the reaction areas, and the adverse effect of cell "flooding," a condition which occurs when the electrode pores become so saturated with electrolyte that the reaction occurs on an electrolyte film above the electrode such that the potential of the reaction cannot be removed to the external circuit. Electrode flooding leads to undesirable cell polarization and reduced efficiency.

It is therefore an object of the invention to provide an electrode which virtually maximizes the reaction area per unit of cell volume thereby increasing power density and efficiency and decreasing the probability of flooding.

Another object of the invention is to provide a multicell power package structure of improved design having a plurality of fuel cells interconnected in series together with a plurality of fuel cells connected in parallel, all of the fuel cells utilizing the improved electrode of the invention.

Other objects, features and advantages of the invention will become apparent to those skilled in the art from the following detailed description of one embodiment thereof when read in conjunction with the appended claims and attached drawings wherein:

FIG. 1 is a perspective view of a preferred embodiment of the electrode of the invention;

FIG. 2 is a perspective view of a structure containing two fuel cells which embody the electrode of the invention. A small portion is cut away to show a part of the interior construction, while the two top cover elements of the cell structure are lifted and separated from each other and from the cell body to show their relation to one another;

FIG. 3 is a cross-sectional view of the structure of FIG. 2, taken along line 3—3 of FIG. 2; and FIG. 4 is a cross-sectional view of the structure of FIG. 2, taken along line 4—4 of FIG. 2.

Figure 5:
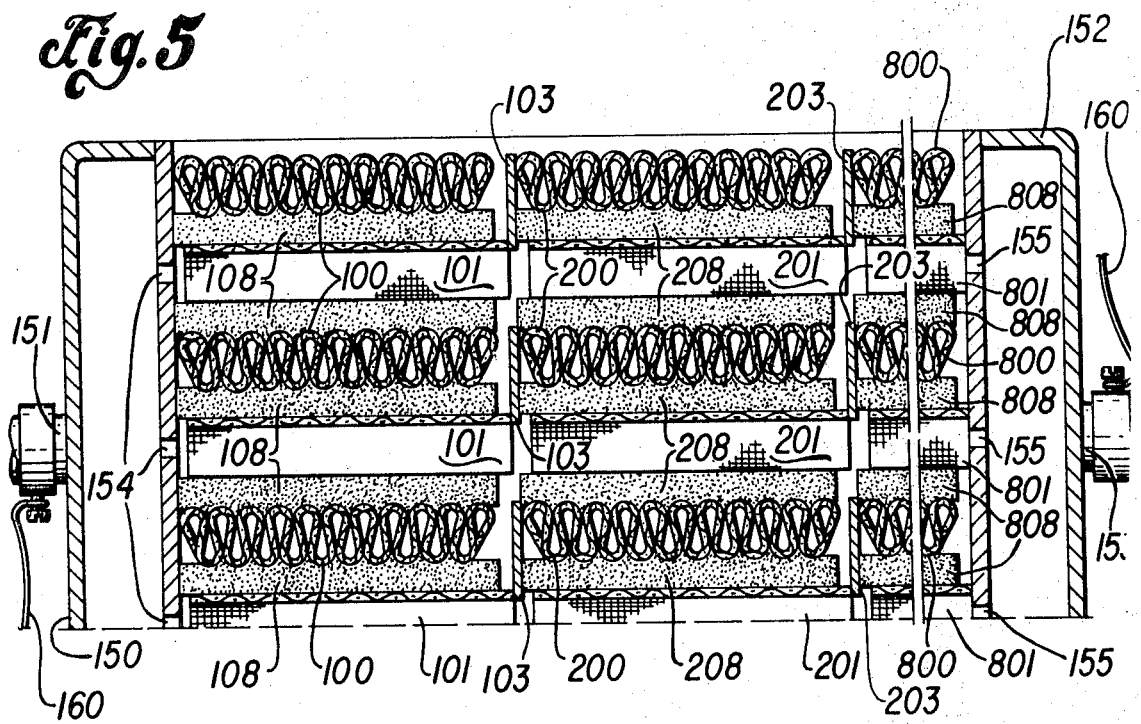
FIG. 5 is a top view of a portion of a multicell power package incorporating fuel cells interconnected in series and a number of fuel cells interconnected in parallel, embodying the electrode of the invention.

The figures in the drawings are not to scale, the dimensions being exaggerated to better illustrate the construction and manner of operation of the invention.

Referring now to the drawings, and particularly to FIG. 1, the electrode of the invention, generally indicated by the numeral 10, may be made, for example, of a solid metal sheet (subject to a qualification noted hereinafter) or a metal screen. As a multiplicity of electrically conducting materials can be used, the material of construction is not intended to be a limitation on the invention. Examples of suitable electrode materials are silver, nickel, iron, stainless steel, silver-coated stainless steel, and nickel-impregnated stainless steel.

The sheet (or screen), alternately folded at such points as 12 and 13 so as to form a continuously pleated, or serpentine, or alternating-tear-drop shaped pattern, is held in the indicated shape by brazing or spot welding points of contact, such as those illustrated by the numeral 14. This folded pattern allows reactants to freely flow through the spaces 15, and the electrolyte to contact the areas generally indicated by the numerals 16 and 16'.

The electrode of the invention, compared to previously proposed electrodes, for any given cell size presents a greatly increased reaction surface area which may have, for example, in excess of 10 times the amount of electrode material than previous designs, vastly increasing the probability of reactant and electrolyte contact and, therefore, resulting in greater obtainable power densities. Moreover, flooding and eventual polarization of the electrode are virtually eliminated. If the electrode is made of screen material, the vast number of "pores" because of and throughout its length makes flooding (and therefore polarization) virtually impossible. And if the electrode consists of a solid metal sheet, flooding is actually impossible since there are no pores to flood.

While the electrode of the invention is suitable for use either as the fuel or reducing electrode (anode), or the air or oxidizing electrode (cathode), it is particularly useful as a fuel electrode in cells using hydrogen as the fuel. Although the exact operation of the electrode in the latter case is not understood, it appears that the hydrogen fuel is adsorbed by the electrode material and carried directly to the electrolyte for reaction therewith, rather than reacting with the electrolyte at the location on the electrode surface with which the reactant is caused to first contact. It can be appreciated that this phenomenon would, in itself, reduce the possibility of cell polarization, since the reaction of hydrogen with electrolyte is from the "inside" of the electrolyte coat on the electrode surface rather than above the electrode as above described in connection with electrode flooding. Hence, even if the electrode of the invention does become flooded in certain of its areas, a partial reaction could still occur because of this phenomenon, and the efficiency of the cell would not be greatly reduced.

Used as a fuel electrode in the limited case where hydrogen is the fuel, then, since the hydrogen is taken into the electrode, the electrode need not be made of a mesh or screen, and may, for example, be composed of a solid metal sheet. Of course, it is to be understood that even though the electrode may be of a solid sheet in this limited case, it is preferably composed of the conventional screen or mesh material, since a screen or mesh will cause the electrolyte to be carrted by the capillarity of the screen pores out onto the reaction surface in the stream of reactant flow, and even if the electrolyte is not evenly distributed over, or in contact with, the entire surface of a screen or mesh electrode, the electrode will, nevertheless, adsorb some of the hydrogen fuel and carry it to the areas where the electrolyte does contact the electrode, as above explained.

Another advantage of the electrode of the invention is its lateral symmetry, allowing its simultaneous use as a dual electrode in two fuel cells connected in parallel. Thus, although one phystcal piece, the electrode can be thought of and used as two electrodes, one along surface 16 and one along surface 16′, electrically connected together.

Although one particular embodiment of the electrode is shown in FIG. 1, it is to be understood that there are a variety of electrode structures suggested by the present invention which could be used to achieve the same result. For example, a coarse wire mesh similar to a kitchen scour pad, could be used, or, as a further example, a number of cylindrical or tubular shaped pieces stacked one on another could be used. The primary objective of the invention is to provide an electrode which, for any given cell size, presents a surface area that will contact the maximum quantity of reactant for reaction with the electrolyte.

Referring now to FIGS. 2, 3 and 4 which show the construction of two fuel cells utilizing the electrode of the invention, it should be noted that the two cells of the structure are mirror images of one another about the symmetrical axis of the common fuel electrode 10. The primary parts of one cell are indicated by numbers and the corresponding parts of the mirror image cell are indicated by the same numbers, each followed by a prime.

General support for the two cells is provided by enclosures 101 and 102, one at each end of the structure. Enclosures 101 and 102 are shaped to provide distribution cavities 119 and 120, respectively, in their interior portions, cavity 119 being for the fuel admitted into the structure from fuel inlet 112, cavity 120 being for the unspent fuel and reaction products which exit through the exhaust tube 113. Metal plates 108 and 109 are provided to close the cavities of respective enclosures 101 and 102, an elongated slot 111 being provided in metal plate 108 to assure even fuel distribution from fuel cavity 119 to the interior of the structure, and elongated slot 115 (shown in FIG. 3) being provided in plate 109 to exhaust the unspent fuel and the reaction products from the structure interior to cavity 120. It will thus be seen that a continuous flow path is established from fuel inlet 112, via cavity 119, to the interior of the fuel electrode structure, thence to cavity 120 and out through exhaust 113.

As shown in FIGS. 2 and 4, across the top and the bottom of the structure are enclosures 107 and 127, shaped like fuel enclosures 101 and 102 but providing oxidizer distribution cavities 131 and 132, respectively, in their interior portions. Oxidizer inlet tube 123 communicate with oxidizer cavity 131 and oxidizer exhaust tube 128 communicates with oxidizer cavity 132. Metal plates 106 and 126 (see FIG. 4) are provided to close the cavities of respective enclosures 107 and 127. Elongated slots 122 and 122′ are provided in metal plate 106 to evenly distribute oxidizer to the oxidizer electrodes, while similar elongated slots 130 and 130′ are provided in plate 126 to exhaust the oxidizer from the cells. It will thus be seen that two continuous oxidizer flow paths are established starting from oxidizer inlet 123, dividing the oxidizer flow through slots 122 and 122′ continuing through each oxidizer electrode 10′ and 10″ (which, as shown in FIG. 2, are vertically oriented), rejoining at slots 130 and 130′, and exiting through oxidizer exhaust 128. Since, the electric potential of the cells is tapped from fuel enclosures 101 and 102, the oxidizer enclosures 107 and 127 must not contact fuel enclosure 102, lest it short the cell. The enclosures, therefore, are made smaller in width than the width of the cell, insulated from the electrode structures, and affixed, as by spot welding, to the fuel enclosure 101.

Between enclosures 101, 102, 107 and 127 is a sandwich of three electrodes separated by an electrolyte supporting material. Because of the symmetry of the electrode of the present invention, as above described, the two cells, electrically connected in parallel, are constructed using a dual or common fuel electrode 10 located in the center of the structure and perpendicularly oriented with respect to the oxidizer electrodes 10′ and 10″. One cell, therefore consists of fuel electrode 10, electrolyte supporting material 114 and oxidizer electrode 10′; the other, a mirror-image cell, consists of fuel electrode 10, electrolyte supporting material 114′ and oxidizer electrode 10″. Fuel electrode 10 is shown made of a solid metal sheet and oxidizer electrodes 10′ and 10″ are shown made of metal screens. As above explained, the common fuel electrode of solid metal as shown in the figures is suitable when the fuel is hydrogen; if other fuels are used, the dual fuel electrode 10 should be made of a screen material as are the oxidizer electrodes 10′ and 10″ as shown in the figures.

To be noted from FIGS. 2, 3 and 4, and as above indicated, the fuel electrode 10, located between the two oxidizer electrodes 10′ and 10″, is perpendicularly oriented with respect to the latter two oxidizer electrodes to facilitate the simultaneous passage of fuel and oxidizer past the respective electrode surfaces. From FIGS. 3 and 4 it can be seen that oxidizing fluid from inlet 123, flowing through slots 122 and 122′, descends directly into the spaces of the upright oxidizer electrodes 10′ and 10″, and from fuel cavity 119 passes into the spaces of fuel electrode 10, being placed crosswise to the oxidizer electrodes 10′ and 10″. The electrolyte supporting material 114 and 114′ which is contiguous to the sides of the fuel electrode 10, may be, for example, a composition of small particles of magnesium oxide which provides capillary action to support an electrolyte such as molten sodium-lithium carbonate eutectic, the magnesium oxide effectively serving as a matrix.

The height of each oxidizer electrode 10′ and 10″ is comparable to the height of the fuel electrode 10, but both oxidizer electrodes are somewhat longer to permit the upper and lower ends thereof to be secured to metal channels 103 and 116 which provide electrical connection between the two oxidizer electrodes 10′ and 10″ and support for the entire electrode structure. On the undersides of channels 103 and 116 are insulating pieces 122 and 123, respectively, which prevent electrical contact between the oxidizer electrodes 10′ and 10″ and fuel electrode 10. Channels 103 and 116 are electrically connected to plate 108 (connection not shown in the figures) but are separated from plate 109. Electrode 10 is electrically connected to plate 109 (as shown in FIG. 3) but is separated from plate 108 (also as shown in FIG. 3). The cell potential is then tapped by electrical connection made to the plates 108 and 109, as shown in the drawings by wires 160 on the fuel inlet and outlet enclosures 112 and 113.

The operation of the above-described twin fuel cells is generally as follows: Fuel, for example, containing hydrogen, is caused to flow through fuel inlet 112 and into the interior of the cell, wherein the fuel comes into contact with the electrode 10 in the void spaces 15 thereof (see FIGS. 1 and 4) and with the electrolyte on the electrode surfaces from electrolyte materials 114 and 114'. A partial chemical reaction occurs causing electrode 10 to exhibit an electric potential. The fuel, continuing through the cell, is then exhausted through outlet 113.

Air or other oxidizing fluid is concurrently caused to flow through inlet 123, to enclosure 131, through slots 122 and 122' and into and through cavities 124 (shown in FIG. 3) of oxidizer electrodes 10' and 10". The air therein comes into contact with oxidizer electrodes 10' and 10" and the electrolyte on the electrode surface from the electrolyte matrixes 114 and 114'. This results in a second partial reaction, causing the oxidizer electrodes 10' and 10" to exhibit an electrical potential lower than the potential of the fuel electrode 10. Because of this potential difference between the fuel electrode 10 and the oxidizer electrodes 10' and 10", an electric current will be caused to flow in an external circuit (not shown) connected therebetween. Since the oxidizer electrodes are connected to metal plates 108 and the fuel electrode is connected to plate 109, electrical connection may be made to the cells via plates 108 and 109 for convenience.

Referring now to FIG. 5, a unit is shown which incorporates a large number of cells similar to the cells described above in connection with FIGS. 2–4. Between fuel enclosures 150 and 152, having respective inlet and exhaust tubes 151 and 153, are a number of vertically oriented oxidizer electrodes 100, 200, 800, etc., and horizontally oriented fuel electrodes 101, 201, 801, etc., separated from the oxidizer electrodes by electrolyte matrixes 108, 208, 808, etc. The fuel electrodes are aligned to have common fuel flow paths, so that fuel entering the cells from enclosure 150 via slots 154 will travel throughout a common flow path in the fuel electrodes 101, 201, 801, etc., and exhaust through openings 155 into enclosure 152, thence to exit via the exhaust tube 153. Each electrode in the power package, except the oxidizer electrodes on the outside edges of the unit, serves as a dual electrode for two cells; hence, in the first group of cells, electrodes 100 and 101 are of cells connected in parallel. Likewise, in the second group of cells, electrodes 200 and 201 are of cells connected in parallel, and so on.

In addition, the parallel groups of cells are connected in series by flanges 103, 203, etc. For example, the oxidizer electrodes 200 are connected to the fuel electrodes 101 by flanges 103. Similarly, all along the series of parallel connected cells in the figure the oxidizer electrodes on the right are connected to a flange connecting the fuel electrodes on the preceding cell to the left. Such connection may be mere physical contact with the flanges, or, perhaps, spot welds thereto. Of course, to maintain the electric potential of the combination so as not to short the unit, fuel electrodes 201 and oxidizer electrodes 100 are not in contact with flange 103. Similarly, at other intermediate flanges (not shown) the oxidizer electrodes on the left are insulated from the flanges and the air electrodes on the right are spot welded to them. On each end, the electrodes are connected to the fuel inlet and exhaust enclosures, 150 and 152, just as if the enclosure were an intermediate flange; that is, the oxidizer electrodes are connected to enclosure 150 and the fuel electrodes are connected to the enclosure 152. As, in the cells of FIG. 2, to facilitate making electrical connection to the power package, electrical connection is made to the inlet and exhaust enclosures 150 and 152 via wires 160.

Not shown in the drawing of FIG. 5 are the oxidizer inlet and exhaust enclosures, but they are, of course, similar to the enclosures 107 and 127 of FIG. 2.

The operation of the combination is similar to the cells described in connection with FIGS. 2–4. The fuel is caused to travel along the fuel paths of electrodes 101, 201, 801, etc., and the air is caused to travel through electrodes 100, 200, 800, etc. The voltage produced between enclosures 150 and 152 is then dependent on the number of cells connected in series, and the current produced is dependent on the number of cells connected in parallel.

To be understood is that the cells described in connection with FIGS. 2–4 and FIG. 5 are illustrative of but two configurations in which the electrode of the invention may be used. The oxidizer and fuel enclosures have been included as shown for the sake of clarity and completeness, and may not be absolutely necessary to the operation of the unit. For example, in FIG. 5, the fuel enclosure 152 and its associated metal plate with the exhaust slots 155 cut therein are not absolutely necessary to the operation of the cell. However, rather than merely allow the spent fuel to "pour out," the enclosure is provided so that the gases may be utilized for other purposes, such as an additive to the oxidizer fluid passing the oxidizer electrodes of the unit. Similarly, fuel exhaust enclosure 102 and oxidizer exhaust enclosure 127 of FIGS. 2–4 are not absolutely necessary to the operation of the unit.

Additional permutations are also suggested which would not depart from the scope of the invention as defined in the appended claims. For example, electrical connection can be made to the power package on the oxidizer electrodes, with appropriate insulating means being provided, or connection may be made to a fuel enclosure and an oxidizer enclosure, again with appropriate insulating means being provided.

Also to be understood is that the power package, when used with particular oxidizing and reducing fluids, must be operated at high temperatures, but means for producing and maintaining the appropriate operating temperature, being well known in the art, have not been shown or described.

Various other modifications of the present invention will become apparent to those skilled in the art without departing from the spirit and scope of the invention as clearly defined in the appended claims.

What is claimed is:

1. In a multicell power package, a structure consisting of two fuel cells electrically interconnected in parallel, comprising:
   (A) a fuel electrode of a continuous sheet of metal screen alternately folded into a tear drop shaped pattern, the folds of said tear drop shaped pattern constituting continuous paths of flow for a fluid fuel,
   (B) two oxidizer electrodes each of a continuous sheet of metal screen alternately folded into a team drop shaped pattern, the folds of said tear drop shaped pattern constituting continuous paths of flow for a fluid oxidizer, each of said two oxidizer electrodes being spaced from said oxidizer fuel electrode thereby forming an electrolyte compartment adapted to contain electrolyte therein,
   (C) electrically conducting fuel supply means physically and electrically connected with said fuel electrode and insulated from said two oxidizer electrodes, and disposed as to constrain fuel in and among said continuous paths of flow of said fuel electrode,
   (D) electrically conducting fuel exhaust means electrically connected with said two oxidizer electrodes, insulated from said fuel electrode, and disposed as to receive spent fuel from said continuous flow paths of said fuel electrode,
   (E) oxidizer supply and exhaust means disposed as to constrain oxidizer fluid to flow in said continuous flow paths of said two oxidizer electrodes and to exhaust spent oxidizer fluid therefrom,
   whereby when fuel is caused to flow through said continuous flow paths of said fuel electrode, and oxidizer is caused to flow through said continuous flow paths of said two oxidizer electrodes, an electric potential is derived between said fuel supply means and said fuel exhaust means.

2. The structure of claim 1 wherein a matrix of magnesium oxide is contained in said electrolyte compartment and said electrolyte is supported in said matrix by the capillarity of the magnesium oxide.

3. In a multicell power package, a structure consisting of two fuel cells electrically interconnected in parallel, comprising:
   (A) a fuel electrode of a continuous sheet of metal screen alternately folded into a tear-drop shaped pattern, the folds of said tear-drop shaped pattern constituting continuous paths of flow for a fluid fuel,
   (B) two oxidizer electrodes each of a continuous sheet of metal screen alternately folded into a tear-drop shaped pattern, the folds of said tear-drop shaped pattern constituting continuous paths of flow for a fluid oxidizer, each of said two oxidizer electrodes being spaced from said fuel electrode thereby forming an electrolyte compartment adapted to contain electrolyte therein,
   (C) electrically conducting fuel supply means physically and electrically connected with said two oxidizer electrodes and insulated from said fuel electrode, and disposed as to constrain fuel in and among said continuous paths of flow of said fuel electrode,
   (D) electrically conducting fuel exhaust means electrically connected with said fuel electrode, insulated from said two oxidizer electrodes, and disposed as to receive spent fuel from said continuous flow paths of said fuel electrode,
   (E) oxidizer supply and exhaust means disposed as to constrain oxidizer fluid to flow in said continuous flow paths of said two oxidizer electrodes and to exhaust spent oxidizer fluid therefrom,
whereby when fuel is caused to flow through said continuous flow paths of said fuel electrode, and oxidizer is caused to flow through said continuous flow paths of said two oxidizer electrodes, an electric potential is derived between said fuel supply means and said fuel exhaust means.

4. The structure of claim 3 wherein a matrix of magnesium oxide is contained in said electrolyte compartment and said electrolyte is supported in said matrix by the capillarity of the magnesium oxide.

5. In a multicell power package, a structure consisting of a plurality of fuel cell electrode arrays electrically interconnected in series comprising:
   (A) at least two segments, each segment comprising:
      (a) an oxidizer electrode of a continuous sheet of metal screen alternately folded into a tear-drop shaped pattern, the folds of said tear-drop shaped pattern constituting continuous oxidizer flow paths,
      (b) a fuel electrode of a continuous sheet of metal screen alternately folded into a tear-drop shaped-pattern, the folds of said tear-drop shaped pattern constituting continuous flow paths, and spaced from said oxidizer electrode thereby forming an electrolyte compartment adapted to contain electrolyte therein.
      (c) an electrically conduative flange connected to said fuel electrode but insulated from said oxidizer electrode, said electrically conductive flange extending in the direction of said oxidizer electrode and disposed so as not to obstruct the flow paths of said fuel electrode and said oxidizer electrode,
   (B) said at least two segments being aligned in end-to-end relation with said continuous flow paths of said fuel electrodes of each of said at least two fuel cell segments constituting an overall fuel flow path from one end of said at least two segments to the other end and disposed in such manner that the flange of one segment is in contact with the oxidizer electrode of the adjacent segment and insulated from the fuel electrode of said adjacent segment, and the oxidizer electrode of said one segment being insulate from the oxidizer electrode of said adjacent segment.

6. The structure of claim 5 wherein a matrix of magnesium oxide is contained in said electrolyte compartment and said electrolyte is supported in said matrix by the capillarity of the magnesium oxide.

7. The structure as in claim 5 wherein first and second inlet enclosures are provided, respectively, for said fuel and said oxidizer, one of said inlet enclosures being electrically connected with said fuel electrode at said one end of said plurality of fuel cell electrode arrays and insulated from said oxidizer electrode, and the other of said inlet enclosures being electrically connected with said oxidizer electrode only at said other end of said plurality of fuel cell electrode arrays and insulated from said fuel electrode.

8. The structure as in claim 5 wherein inlet and outlet enclosures are provided for one of said reactants, said inlet enclosure being electrically connected with said fuel electrode at said one end of said plurality of fuel cell electrode arrays and insulated from said oxidizer electrode, and said outlet enclosure being electrically connected with said oxidizer electrode at said other end of said plurality of fuel cell electrode arrays and insulated from said fuel electrode.

9. In a multicell power package, a structure consisting of a plurality of fuel cell electrode arrays electrically interconnected in series comprising:
   (A) at least two segments, each segment comprising:
      (a) an oxidizer electrode of a continuous sheet of metal screen alternately folded into a tear-drop shaped pattern, the folds of said tear-drop shaped pattern constituting continuous oxidizer flow paths,
      (b) a fuel electrode of a continuous sheet of metal screen alternately folded into a tear-drop shaped pattern, the folds of said tear-drop shaped pattern constituting continuous fuel flow paths, spaced from said oxidizer electrode thereby forming an electrolyte compartment adapted to contain electrolyte therein,
      (c) an electrically conductive flange connected to said fuel electrode but insulated from said oxidizer electrode, said electrically conductive flange extending in the direction of said oxidizer electrode and disposed so as not to obstruct the flow paths of said fuel electrode and said oxiizer electrode,
   (B) said at least two segments being aligned in end-to-end relation with said continuous flow paths of said fuel electrodes of each of said at least two fuel cell segments constituting an overall fuel flow path from one end of said at least two segments to the other end and disposed in such manner that the flange of one segment is in contact with the oxidizer electrode of the adjacent segment and insulated from the fuel electrode of said adjacent segment, and the oxidizer electrode of said one segment being insulated from the oxidizer electrode of said adjacent segment,
   (C) electrically conducting fuel supply means connected with a fuel electrode at said one end of said at least two fuel cell segments, and insulated from the oxidizer electrode at said one end of said at least two fuel cell segments, and disposed so as to constrain fuel introduced into said fuel flow paths,
   (D) electrically conducting fuel exhaust means connected with the oxidizer electrode at said other end of said at least two fuel cell segments, said electrically conducting fuel exhaust means being insulated from the fuel electrode at said other end of said at least two fuel cell segments, and disposed as to receive spent fuel from said fuel flow paths.

(E) oxidizer supply and exhaust means disposed in such manner that oxidizer is caused to flow into and through said continuous flow paths of said oxidizer electrodes, said oxidizer supply and exhaust means being insulated from said electrodes and from at least one of said fuel supply or said fuel exhaust means, whereby when fuel is constrained in said continuous fuel flow paths in said fuel electrodes and oxidizer is constrained in said continuous flow paths of said oxidizer electrode, an electric potential is derived between said electrically conducting fuel exhaust means.

References Cited

UNITED STATES PATENTS

| | | | |
|---|---|---|---|
| 676,524 | 6/1901 | Abbey et al. | 136—45 |
| 800,128 | 9/1905 | Gardiner | 136—45 |
| 3,378,406 | 4/1968 | Rosansky | 136—86 |

FOREIGN PATENTS

| | | |
|---|---|---|
| 6500234 | 7/1965 | Netherlands. |

ALLEN B. CURTIS, Primary Examiner

U.S. Cl. X.R.

136—45, 120